(12) United States Patent
Deurenberg et al.

(10) Patent No.: US 8,192,066 B2
(45) Date of Patent: Jun. 5, 2012

(54) TILED LIGHTING DEVICE

(75) Inventors: Peter Hubertus Franciscus Deurenberg, S Hertogenbosch (NL); Michel Cornelis Josephus Marie Vissenberg, Eindhoven (NL); Willem Lubertus Ijzerman, Eindhoven (NL); Erik Boonekamp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 278 days.

(21) Appl. No.: 12/594,204

(22) PCT Filed: Mar. 31, 2008

(86) PCT No.: PCT/IB2008/051189
§ 371 (c)(1),
(2), (4) Date: Oct. 1, 2009

(87) PCT Pub. No.: WO2008/122909
PCT Pub. Date: Oct. 16, 2008

(65) Prior Publication Data
US 2010/0109567 A1 May 6, 2010

(51) Int. Cl.
*F21V 7/04* (2006.01)

(52) U.S. Cl. .................................. 362/615; 362/249.03

(58) Field of Classification Search .................. 362/227, 362/249.01, 249.03, 612, 615
See application file for complete search history.

(56) References Cited

U.S. PATENT DOCUMENTS

| | | | |
|---|---|---|---|
| 5,889,568 A * | 3/1999 | Seraphim et al. ............... | 349/73 |
| 6,502,968 B1 * | 1/2003 | Simon ........................... | 362/489 |
| 6,848,819 B1 * | 2/2005 | Arndt et al. .................... | 362/545 |
| 7,458,709 B2 * | 12/2008 | Lang et al. ..................... | 362/612 |
| 2001/0017774 A1 | 8/2001 | Ito et al. | |
| 2005/0116667 A1 | 6/2005 | Mueller et al. | |
| 2005/0128374 A1 | 6/2005 | Furukawa | |
| 2005/0168967 A1 | 8/2005 | Kao et al. | |
| 2006/0221638 A1 | 10/2006 | Chew et al. | |
| 2008/0205078 A1 * | 8/2008 | Karlicek et al. ............... | 362/612 |
| 2008/0205080 A1 * | 8/2008 | Erchak et al. .................. | 362/613 |

* cited by examiner

*Primary Examiner* — Thuy Vinh Tran
(74) *Attorney, Agent, or Firm* — Mark L. Beloborodov

(57) ABSTRACT

The present invention relates to a lighting device (10) comprising a tiled light guide (16) comprising a central tile (12b) and at least one end tile (12a, 12c), the end tile(s) (12a, 12c) being arranged at an edge (24, 26) of the light guide (16); at least one solid state light source (18) arranged for coupling light into the light guide (16) in a general direction towards or away from the end tile(s) (12a, 12c); and a plurality of out-coupling structures (20) arranged for coupling light out of the light guide (16); wherein the end tile(s) (12a, 12c) has inherent in-coupling and/or inherent out-coupling of light different from the central tile (12b).

14 Claims, 5 Drawing Sheets

TILED LIGHTING DEVICE

FIELD OF THE INVENTION

The present invention relates to a tiled lighting device.

BACKGROUND OF THE INVENTION

Progress in the brightness, lumen efficacy and affordability of solid state light sources such as light emitting diodes (LEDs) enables new lighting applications that are no longer restricted to niche markets. LEDs offer several advantages over traditional light sources, such as long lifetime, low operating voltage, instant on, etc. For these and other reasons, LEDs are becoming more and more suited for making lamps for several applications such as color variable lamps, spotlights, LCD backlighting, architectural lighting, stage lighting, etc.

For many lighting applications, the light of a single LED is not sufficient, and light of multiple LEDs needs to be combined to form a light source. Hereto, US2005/0116667 (Mueller et al.) discloses a tiled lighting system with LEDs, wherein a plurality of alike light tiles are arranged side by side and interconnected to tile any surface, such as a floor, ceiling, wall or building exterior.

However, an anticipated problem in lighting devices using a plurality of light sources, such as the lighting device of US2005/0116667, is the overall uniformity of the light emitted from the lighting device.

SUMMARY OF THE INVENTION

It is an object of the present invention to at least partly overcome this problem, and to provide an improved tiled lighting device.

This and other objects that will be apparent from the following description is achieved according to one aspect of the invention by means of a tiled lighting device according to the appended claim 1, comprising a tiled light guide comprising a central tile and at least one end tile, the end tile(s) being arranged at an edge of the light guide; at least one solid state light source arranged for coupling light into the light guide in a general direction towards or away from the end tile(s); and a plurality of out-coupling structures arranged for coupling light out of the light guide; wherein the end tile(s) has inherent in-coupling and/or inherent out-coupling of light different from the central tile.

Thus, there is disclosed a tiled lighting device comprising a central tile and at least one end tile forming part of a light guide. The light guide is preferably a light guide plate and may comprise additional tiles (central tiles or end tiles). The end tile is arranged at an edge of the light guide, while the central tile generally is surrounded by other tiles. The tiles are preferably arranged side by side and optically connected or aligned so that any in-coupled light can travel from one tile to a neighboring tile. The in-coupled light is provided by at least one solid state light source, and the light is introduced in a general direction towards or away from the end tile. The light source(s) may for example be side-emitting light source(s) arranged in the tiles or otherwise in connection with the tiles. The in-coupled light may then be mixed in the light guide before it is coupled out by means of a plurality of out-coupling structures. The out-coupling structures may for instance be tilted reflectors or the like arranged in the tiles or otherwise in connection with the tiles. However, since the light is in-coupled in a general direction, e.g. in essentially one direction, there may be a build up of excessive light in an end tile which is situated in the direction of the light compared to the rest of the light guide. This surplus of light may cause glare or bright spots or otherwise be lost. Likewise, there may be a shortage of light in an end tile at the opposite side of the light guide, i.e. an end tile situates "away" from the in-coupled light. This shortage may cause a dark rim or other dark area at the end tile. To this end, according to the present invention, the end tile has inherent in-coupling and/or inherent out-coupling of light different from the central tile, for producing a relative uniform overall emission of light from the tile lighting device without the above mentioned glare or bright spots or dark rims. Inherent in-coupling refers here to light introduced by any light source(s) arranged in (or for) the particular tile, while inherent out-coupling refers to extraction by any out-coupling structures arranged in (or for) the particular tile. The tiled lighting device according to the invention where a distinction is made between end tiles and central tiles has a superior performance compared to any tiled lighting device where all the tiles are the same.

In one embodiment, the at least one end tile comprises a first end tile arranged at a first edge of the light guide and the at least one solid state light source is arranged for coupling light into the light guide in a general direction towards the first end tile. Hereto, for managing the above mentioned light surplus, the first end tile has lower inherent in-coupling and/or higher inherent out-coupling of light than the central tile, whereby the relative uniform overall output may be produced. "Higher"/"lower" should here be construed as higher/lower per area unit.

In another embodiment, the at least one end tile comprises a second end tile arranged at a second edge of the light guide and the at least one solid state light source is arranged for coupling light into the light guide in a general direction away from the second end tile (that is, the second end tile may be positioned at the opposite side of the light guide compared to the above first end tile). Hereto, for compensating for the above mentioned light shortage, the second end tile has higher inherent in-coupling and/or higher inherent out-coupling of light than the central tile, whereby the relative uniform overall output may be produced.

To achieve the above mentioned changes in in-coupling/out-coupling, in one embodiment of the present invention, the first end tile may have a lower distribution density of light sources than the central tile (that is, a distribution density of the light sources is varied across the light guide according to areas where the light sources are located), so that less light is introduced in the end tile from its own light sources in order to reduce the surplus light causing the glare/bright spots or losses. In the extreme, the first end tile may have no light sources at all. Fewer or no light sources means that the first end tile becomes less expensive to manufacture. Instead of the omitted light sources, the "freed" space in the first end tile can be occupied by other electrical components. Such an electrical component is preferably common for the entire lighting device (i.e. it does not have to be reproduced for each tile), such as the lighting device's AC/DC converter (which may be necessary for supplying power to the light sources), a receiver for remote control of the lighting device (e.g. an infrared receiver or the like), batteries for off-line operation of the lighting device (which is beneficial in emergency lighting applications), an interface converter, etc. With respect to the second end tile, it may have a higher distribution density of light sources than the central tile to achieve the above mentioned higher inherent in-coupling. As an alternative (or in addition) to omitting/adding light sources, the lighting device may further comprise means for selectively controlling the brightness of at least one light source of the end tiles during operation. For the first end tile, the brightness may be decreased during operation. In the extreme, some or all of the light sources of the first end tile may be completely turned off during operation. For the second end tile, the brightness may be increased during operation. This again means that the amount of light introduced in the end tiles is adjusted, allowing a more uniform overall light emission from the light guide.

In another embodiment, the end tiles may have a higher distribution density of out-coupling structures than the central tile, so that more light may be out-coupled from the end tiles by their own out-coupling structures compared to the central tile. That is, a distribution density of the out-coupling structures is varied across the light guide according to areas where the out-coupling structures are located. In the first end tile, the higher out-coupling beneficially serves to extract surplus light in a controlled way to avoid the above mentioned bright spots/glare. In the second end tile, the higher out-coupling beneficially serves to extract more light in order to compensate for the above mentioned dark area. As an alternative (or in addition) to the extra out-coupling structures, the out-coupling structures of the end tiles may have a higher out-coupling capability than those of the central tile. The higher out-coupling capability may for example be realized by tilted reflectors having a larger reflective surface area, or by using reflective out-coupling structures having higher reflectance.

Preferably, the at least one solid state light source to be used in the tiled lighting device of the present inventions comprises a plurality of light emitting diodes (LEDs). LEDs have long lifetime, low operating voltage, are instantly turned on upon actuation, etc.

According to another aspect of the invention, there is provided a tiled lighting device comprising: a tiled light guide comprising a plurality of tiles; at least one solid state light source arranged for coupling light into the light guide; and a plurality of out-coupling structures arranged for coupling light out of the light guide; wherein the inherent in-coupling and/or out-coupling of light of the tiles is varied across the light guide according to areas of the light guide where the tiles are located. This aspect exhibits similar advantages etcetera as the previously discussed aspect of the invention.

BRIEF DESCRIPTION OF THE DRAWINGS

These and other aspects of the present invention will now be described in more detail, with reference to the appended drawings showing currently preferred embodiments of the invention.

DETAILED DESCRIPTION

Figure 1:
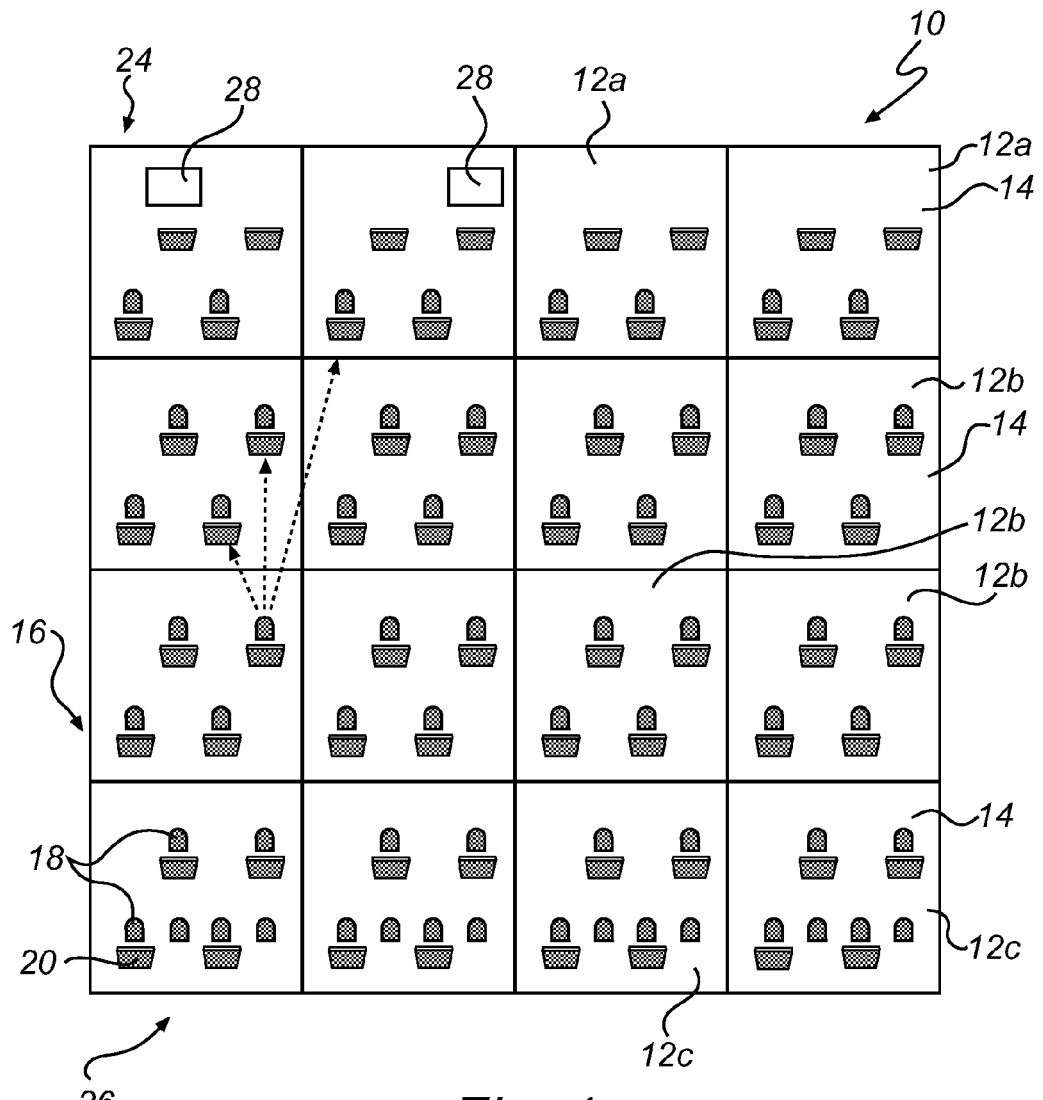
FIG. 1 is a schematic top view of a tiled lighting device according to an embodiment of the invention.

FIG. 1 illustrates a tiled lighting device 10 according to the invention. The lighting tiled device 10 is build up of a plurality of modules or tiles generally designated 12. Depending on the number and size of tiles 12 and how they are arranged, the lighting device 10 may have virtually any size and shape, making it more versatile than a common luminary having a fixed size and shape. For instance, the lighting device 10 may be customized to cover a certain area or to fit in a certain space. In FIG. 1, the exemplary tiled lighting device 10 is made up of 4×4 tiles 12, all having essentially the same size and shape.

Each tile 12 in the lighting device 10 of FIG. 1 comprises a square, transparent or translucent sub-light guide plate 14. Other forms may be used, such as rectangular tiles, and the not all tiles in the lighting device have to be of the same shape and size. The transparent or translucent sub-light guide plate 14 may be made of glass or plastics.

The tiles 12 are generally arranged side by side in order to form an overall light guide plate 16. To this end, neighboring tiles are preferably optically coupled, or aligned, so that light from one tile can enter the next tiles with minimal disturbance.

Further, each tile 12 in the lighting device of FIG. 1 comprises side emitting solid state light sources 18 and out-coupling structures 20. The light sources 18 are for example light emitting diodes (LEDs), such as inorganic based LEDs, organic based LEDs (OLEDs and polymer LEDs) and laser diodes. The general idea of the lighting device 10 is to introduce light into the light guide plate 16 by means of the LEDs 18, allow the light to be mixed in the light guide plate 16, and then extract the light from the light guide plate 16 vertically by means of the out-coupling structures 20, to create the illumination. In order to control and power the LEDs 18 (as well as any other electrical component(s) in the tiles 12), each tile 12 has electrical connectors (not shown) to connect it to other tiles 12 or the like, either directly or via for example an underlying printed circuit board (PCB) (not shown).

Figure 2:
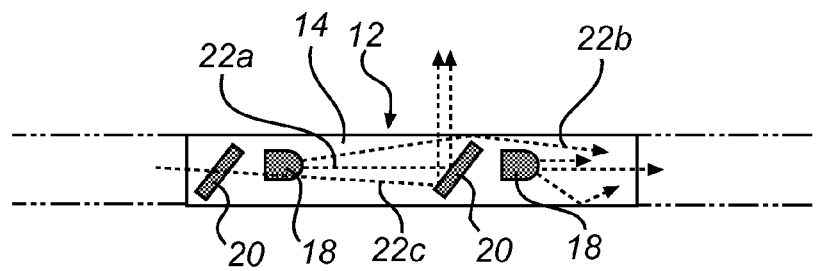
FIG. 2 is a schematic cross-section of a tile of the lighting device of FIG. 1.

A cross-section of an exemplary tile 12 in the lighting device 10 of FIG. 1 is shown in FIG. 2, where each out-coupling structure 20 is a reflector arranged at about 45° with respect to the plane of the light guide plate 16. During operation, light from the LEDs 18 in the exemplary tile (represented by exemplary ray-traces 22a, 22b) as well as light from LEDs in other tiles (represented by exemplary ray-traces 22c) may be reflected by the out-coupling structures 20, whereby it is out-coupled from the light guide plate 16 in a direction essentially perpendicular to the horizontal plane of the light guide plate 16. Any light in the light guide plate 16 striking its top or bottom surface at relatively large angles to the normal of the light guide plate 16 (such as ray-trace 22b) is generally not coupled out due to total internal reflection (TIR), but is instead reflected back into the light guide plate 16 for further mixing. To avoid that light from the LEDs 18 directly exits the light guide plate 16 before it is properly mixed, the light from the LEDs is preferably collimated so that the light rays become more or less parallel to the horizontal direction of the light guide plate 16.

Returning to FIG. 1, all LEDs 18 are pointing in the same direction from an edge 26 (second edge) towards an edge 24 (first edge) of the light guide plate 16. The LEDs 18 are further generally arranged in a staggered pattern across the plane of the light guide plate 16, while the out-coupling structures 20 are generally arranged behind the LEDs 18 in a corresponding staggered pattern. This structure may be beneficial in order to avoid losses due to absorption or scattering of light at adjacent LEDs 18, and to improve the mixing of the light before it is out-coupled from the light guide plate 16. However, it may also cause uneven light intensity as explained in the following.

In the lighting device 10, the light is generally guided in one direction, from bottom to top in the figure. In a given tile 12, this may result in a surplus of light at the end (rich end) towards which the LEDs 18 are directed, and a shortfall of light in the opposite end (lean end) of the tile. The shortfall at the lean end in a first tile could be compensated by the surplus transferred from the rich side of a neighboring, second tile that is connected to the lean end of the first tile. Thus, for a continuous system of tiles, there would be little or no variation in intensity. However, the surplus in the tiles at the edge 24 cannot be transferred in this way since they have no neighboring tiles in the relevant direction, which results in an overall surplus of light in the tiles at the edge 24, which in turn may cause glare or bright spots and generally not very uniform emission of light from the lighting device 10. Similarly, the shortfall in the tiles at the edge 26 cannot be compensated since they have no neighboring tiles in the relevant direction, which results in an overall shortage of light in the tiles at the edge 24.

Hereto, the present invention proposes measures to adjust the amount of light entered into and extracted from tiles positioned at the edges 24 and 26 in order to avoid the above mentioned glare and bright spots and dark rim and create a uniform overall emission of light from the lighting device 10.

In FIG. 1, this is achieved by having a lower distribution density of LEDs 18 or fewer LEDs 18 in the tiles next to the edge 24, i.e. the end tiles in the direction of the in-coupled light. These tiles are referred to as (first) end tiles 12a. Additionally, the tiles next to the edge 26 referred to as (second) end tiles 12c have a higher distribution density of LEDs 18 or additional LEDs 18. The remaining tiles are referred to as central tiles 12b arranged in a central portion of the light guide plate 16.

Fewer LEDs 18 in each end tile 12a than in each central tile 12b means that less light is introduced into the tiles 12a, which compensates for the above mentioned surplus of light originating from the central tiles 12b, and the consequence is that there is less or no surplus of light causing the above mentioned glare and bright spots. The more LEDs 18 omitted in the end tiles 12a, the more surplus may be compensated for. In one embodiment, all LEDs 18 could be omitted from the end tiles 12a, as illustrated in FIG. 3.

Figure 3:
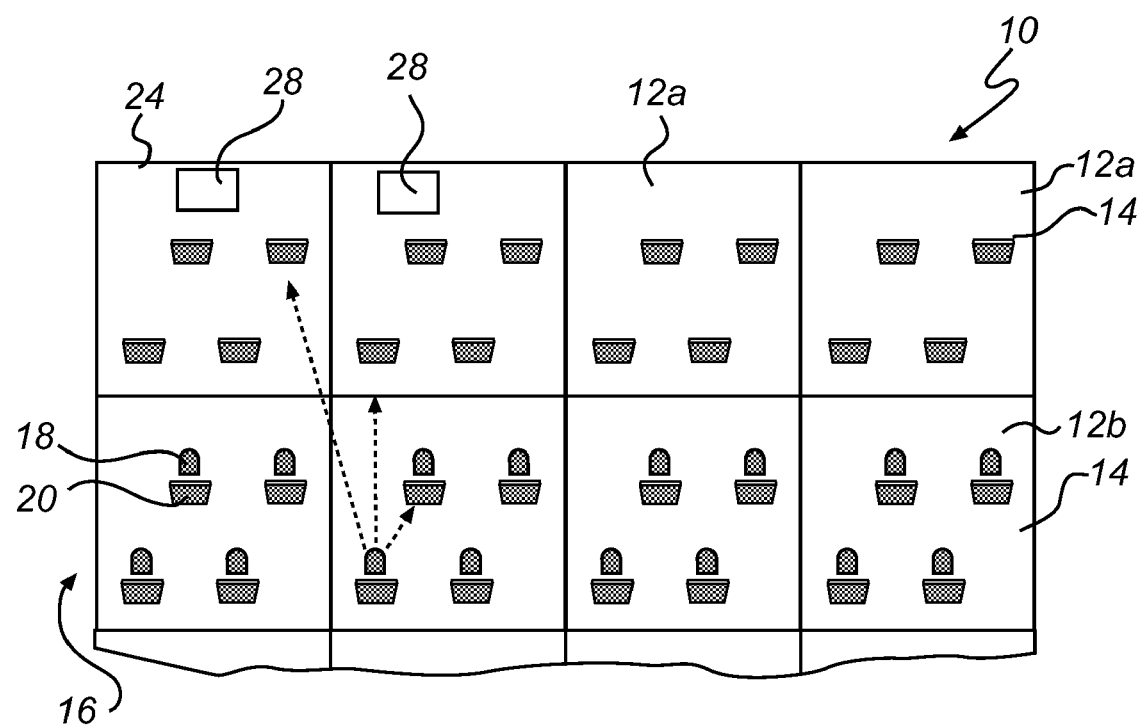
FIG. 3 is a schematic top view of a portion of a tiled lighting device according to another embodiment of the invention.

In the case of fewer or no LEDs 18, the "freed" space in the end tiles 12a can be accommodated by other electronic components 28, as shown in FIGS. 1 and 3. The electric components 28 may for instance be an AC/DC converter (which may be necessary for supplying power to the LEDs 18), a receiver for remote control of the lighting device 10 (e.g. an infrared receiver or the like), batteries for off-line operation of the lighting device 10 (which is beneficial in emergency lighting applications), an interface converter, etc.

On the other hand, additional LEDs 18 in each end tile 12c than in each central tile 12b means that more light is introduced into the tiles 12c, which may compensate for the above mentioned shortage of light, and the consequence is that the output of the end tiles 12c may be matched to that of the central tiles 12b (and that of the end tiles 12a) to create a relative uniform overall illumination.

Figure 4:
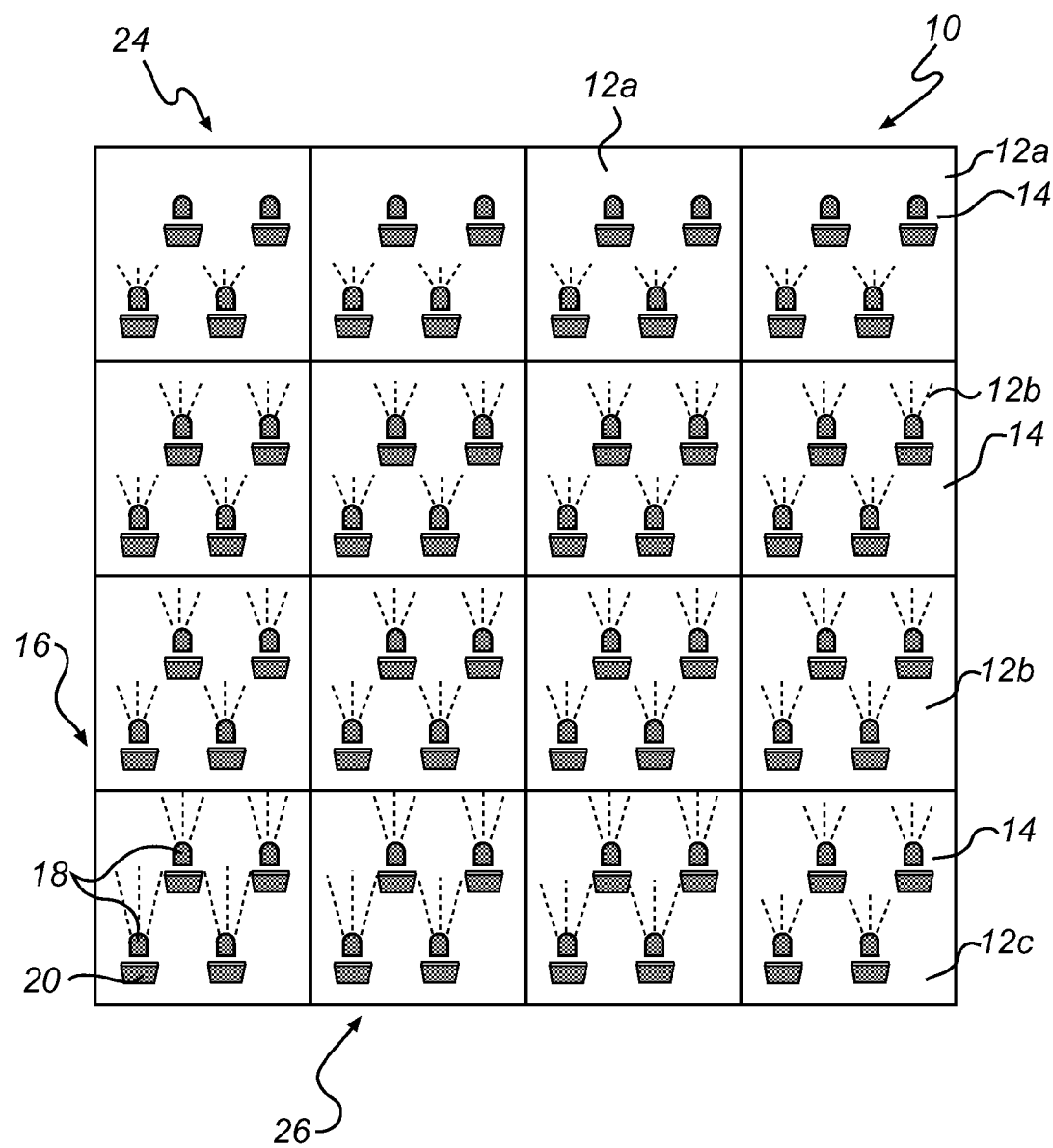
FIG. 4 is a schematic top view of a tiled lighting device according to another embodiment of the invention.

As an alternative (or in addition) to omitting/adding LEDs 18 as in the embodiments of FIGS. 1 and 3, the brightness of the LEDs 18 in the end tiles may be adjusted during operation of the lighting device 10 to compensates for any surplus/shortage of light in the end tiles 12a and 12c, as schematically illustrated in FIG. 4. In the end tiles 12a, some LEDs 18 may even be completely turned off (the top row in FIG. 4), while others are dimmed (the second row from the top in FIG. 4). More surplus of light can be compensated for by a larger decrement of the brightness or by turning off a larger number of LEDs 18. On the other hand, more shortfall can be compensated for by a larger increment of the brightness. This embodiment is beneficial since tiles having a similar structure may be used all throughout the lighting device, but it requires on the other hand a more complicated control unit (not shown) to adjust the LED brightness.

Figure 5:
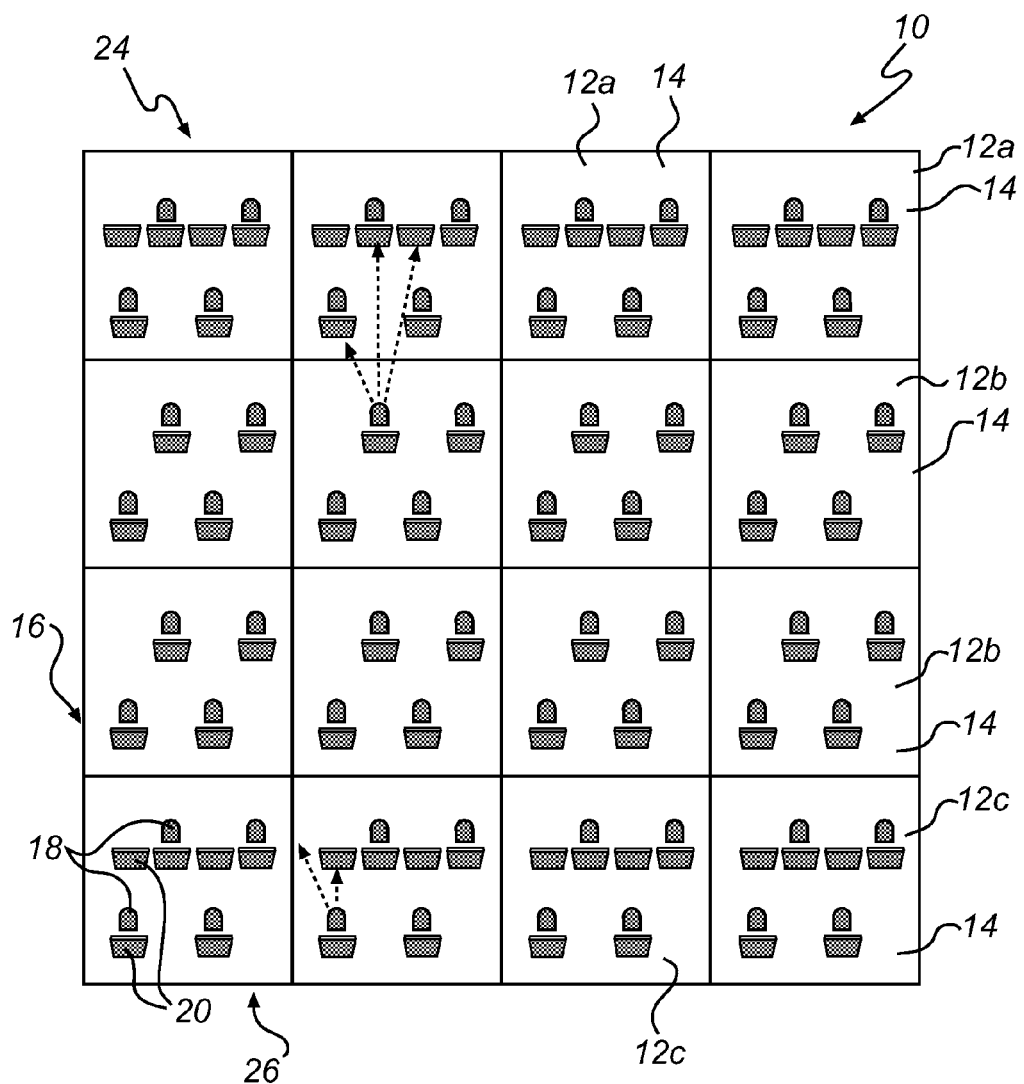
FIG. 5 is a schematic top view of a tiled lighting device according to another embodiment of the invention.
Figure 6:
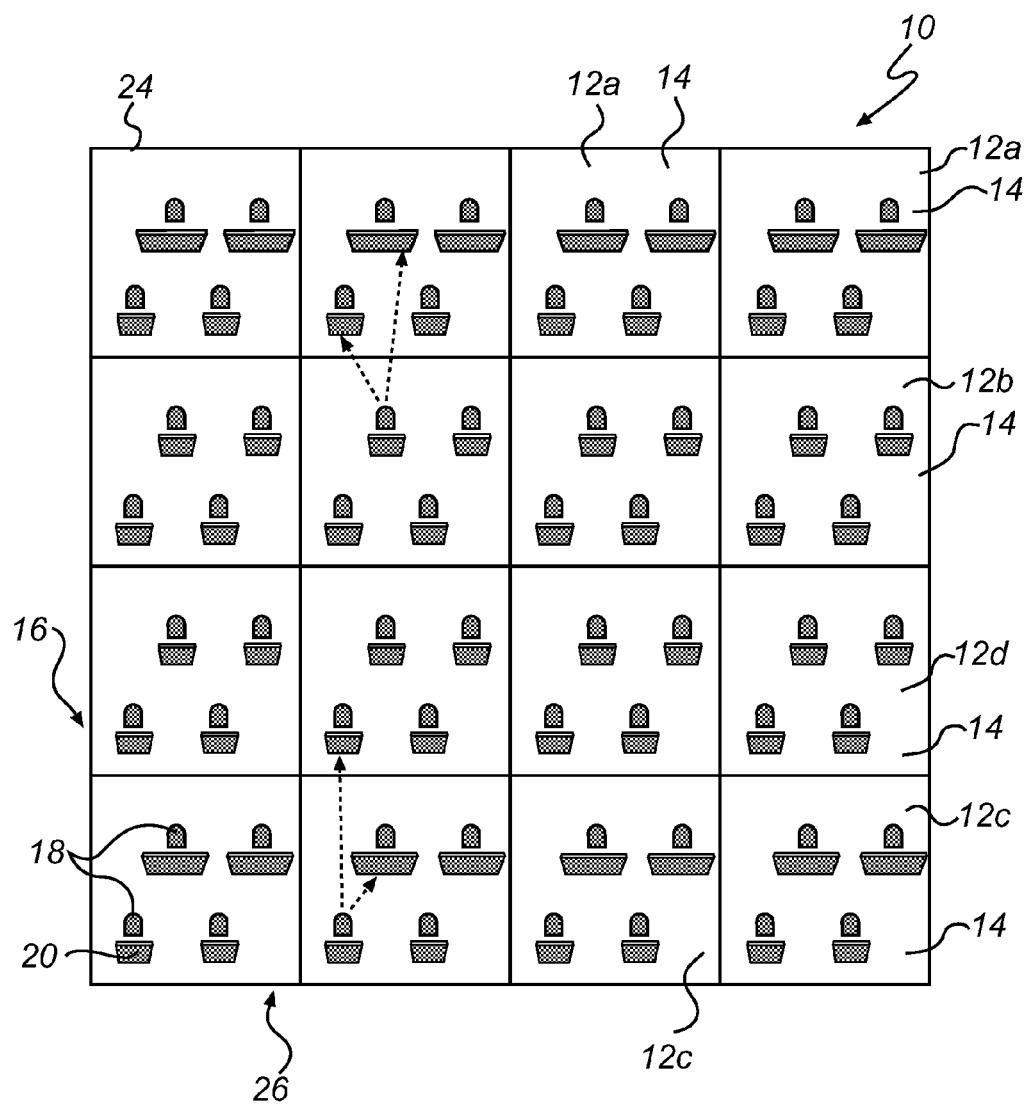
FIG. 6 is a schematic top view of a tiled lighting device according to another embodiment of the invention.

Another embodiment of the present invention is illustrated in FIG. 5. Here, t additional out-coupling structures 20 are provided in the end tiles in the path of the in-coupled light, resulting in a higher density of out-coupling structures 20 in the end tiles 12a compared to the central tiles 12b. The additional out-coupling structures 20 in the end tiles 12a serve to extract the surplus light in a controlled way to avoid the above mentioned bright spots/glare. A larger number of additional out-coupling structures 20 in the end tiles 12a manages more extra light in said end tiles 12a. As an alternative (or in addition) to the extra out-couplings structures 20 of FIG. 5, out-couplings structures 20a having higher out-coupling capability than the other out-coupling structures 20 can be used in the end tiles 12a, as illustrated in FIG. 6. To this, the out-coupling structures 20a may have a larger reflecting area than the out-coupling structures 20. For instance, a single out-coupling structure extending along essentially the whole length of the edge 24 could be used (not shown). Additionally or alternatively, the reflectance of the out-coupling structures in the end tiles 12a could be increased to enhance the output of light from the end tiles 12a.

Likewise, in FIGS. 5 and 6, a higher density of out-coupling structures and/or more efficient out-coupling structures may be exercised with respect to the second end tiles 12c (optionally in combination with the above mentioned additional in-coupling), in order to extract more light to compensate for the above mentioned dark rim or output shortage.

With respect to the embodiments described above, it should be noted that they could be combined or separated in various ways. For instance, it is envisaged a tiled lighting device wherein the end tiles have both fewer LEDs and a larger distribution of out-coupling structures compared to the central tiles. Likewise, it is envisaged a tiled lighting device having end tiles 12a, but no end tiles 12c (and vice versa).

Further, other general arrangements of the LEDs and out-coupling structures could be used in the lighting device, and the out-coupling structures could have other constitutions. The out-coupling structures could for example be embodied as wedges, grooves, dents, scattering elements, or the like.

Also, the above teachings could be exercised also in a non-tiled lighting device. Such a lighting device comprises: a light guide including a central portion and an outer edge portion; a plurality of solid state light sources for coupling light into the light guide in essentially one direction towards the edge portion; and a plurality of out-coupling structures for coupling light out of the light guide; wherein the edge portion has lower inherent in-coupling and/or higher inherent out-coupling of light than the central portion. In the above figures, the central portion could be envisages as the central tiles 12b and the outer edge portion could be envisaged as the end tiles 12a.

Applications for the tiled lighting device according to the present invention include general interior lighting such as office lighting and lighting in shops, architectural lighting, signage system, etc.

The person skilled in the art realizes that the present invention by no means is limited to the preferred embodiments described above. On the contrary, many modifications and variations are possible within the scope of the appended claims.

The invention claimed is:

1. A tiled lighting device, comprising:
   a tiled light guide comprising a central tile and at least one end tile, the at least one end tile being arranged at an edge of the light guide;
   at least one solid state light source arranged for coupling light into the light guide in a general direction towards or away from the at least one end tile; and
   a plurality of out-coupling structures arranged for coupling light out of the light guide; wherein the at least one end tile has inherent in-coupling and/or inherent out-coupling of light different from the central tile, wherein said at least one end tile comprises a first end tile arranged at a first edge of the light guide; the at least one solid state light source is arranged for coupling light into the light guide in a general direction towards the first end tile; and the first end tile has lower inherent in-coupling and/or higher inherent out-coupling of light than the central tile.

2. A lighting device according to claim 1, wherein the first end tile has a lower distribution density of light sources than the central tile.

3. A lighting device according to claim 2, wherein at least one light source of the first end tile is replaced by an electrical component.

4. A lighting device according to claim 3, wherein the electrical component is common for the lighting device.

5. A lighting device according to claim 1, further comprising means for selectively controlling the brightness of at least one light source of the end tiles during operation.

6. A lighting device according to claim 1, wherein the end tile, has a higher distribution density of out-coupling structures than the central tile.

7. A lighting device according to claim 1, wherein the out-coupling structures of the end tile have a higher out-coupling capability than those of the central tile.

8. A lighting device according to claim 1, wherein the at least one solid state light source comprises a plurality of light emitting diodes.

9. A lighting tile device according to claim 1, wherein
   said at least one end tile further comprises a second end tile arranged at a second edge of the light guide;
   the at least one solid state light source is arranged for coupling light into the light guide in a general direction away from the second end tile; and the second end tile has higher inherent in-coupling and/or higher inherent out-coupling of light than the central tile.

10. A tiled lighting device, comprising:
    a tiled light guide comprising a central tile and at least one end tile being arranged at an edge of the light guide;
    at least one solid state light source arranged for coupling light into the light guide in a general direction towards or away from the at least one end tile; and
    a plurality of out-coupling structures arranged for coupling light out of the light guide;
    wherein the at least one end tile has inherent in-coupling and/or inherent out-coupling of light different from the central tile, wherein said at least one end tile comprises a first end tile arranged at a first edge and a second end tile arranged at a second edge of the light guide; the at least one solid state light source is arranged for coupling light into the light guide in a general direction away from the second end tile; and the second end tile has higher inherent in-coupling and/or higher inherent out-coupling of light than the central tile.

11. A lighting device according to claim 10, wherein the second end tile has a higher distribution density of light sources than the central tile.

12. A lighting device according to claim 10, further comprising means for selectively controlling the brightness of at least one light source of the end tile during operation.

13. A lighting device according to claim 10, wherein the at least one solid state light source comprises a plurality of light emitting diodes.

14. A tiled lighting device, comprising:
    a tiled light guide comprising a plurality of tiles including a first end tile, a second end tile, and a central tile;
    at least one solid state light source arranged for coupling light into the light guide; and
    a plurality of out-coupling structures arranged for coupling light out of the light guide; wherein inherent in-coupling and/or out-coupling of light of the tiles is varied across the light guide according to areas of the light guide where the tiles are located, wherein
    the first end tile arranged at a first edge of the light guide; the at least one solid state light source is arranged for coupling light into the light guide in a general direction towards the first end tile; and the first end tile has lower inherent in-coupling and/or higher inherent out-coupling of light than the central tile; and
    the second end tile arranged at a second edge of the light guide; the at least one solid state light source is arranged for coupling light into the light guide in a general direction away from the second end tile; and the second end tile has higher inherent in-coupling and/or higher inherent out-coupling of light than the central tile.

* * * * *